(12) United States Patent
Boehmer et al.

(10) Patent No.: US 12,362,651 B2
(45) Date of Patent: Jul. 15, 2025

(54) CIRCUIT ARRANGEMENT FOR A CURRENT CONVERTER

(71) Applicant: Siemens Mobility GmbH, Munich (DE)

(72) Inventors: Juergen Boehmer, Stein (DE); Eberhard Ulrich Krafft, Nuremberg (DE); Andreas Maerz, Leinburg (DE); Andreas Nagel, Nuremberg (DE); Jan Weigel, Grossenbuch (DE)

(73) Assignee: Siemens Mobility GmbH, Munich (DE)

( * ) Notice: Subject to any disclaimer, the term of this patent is extended or adjusted under 35 U.S.C. 154(b) by 0 days.

(21) Appl. No.: 17/725,743

(22) Filed: Apr. 21, 2022

(65) Prior Publication Data

US 2022/0345027 A1 Oct. 27, 2022

(30) Foreign Application Priority Data

Apr. 21, 2021 (DE) ...................... 10 2021 203 996.0

(51) Int. Cl.
*H02M 1/088* (2006.01)
*H02M 1/00* (2007.01)
(Continued)

(52) U.S. Cl.
CPC ......... *H02M 1/088* (2013.01); *H02M 1/0085* (2021.05); *H02M 1/0087* (2021.05);
(Continued)

(58) Field of Classification Search
CPC ...... H02M 1/08; H02M 1/088; H02M 1/0083; H02M 1/0085; H02M 1/0087;
(Continued)

(56) References Cited

U.S. PATENT DOCUMENTS

2012/0106220 A1* 5/2012 Yamaguchi ............ H05K 7/209
363/131
2012/0147641 A1 6/2012 Yamaguchi et al.
(Continued)

FOREIGN PATENT DOCUMENTS

CN 101826837 A * 9/2010
EP 3404818 B1 1/2020
(Continued)

OTHER PUBLICATIONS

English translation of WO2015072060. (Year: 2015).*
(Continued)

*Primary Examiner* — Thienvu V Tran
*Assistant Examiner* — Carlos O Rivera-Perez
(74) *Attorney, Agent, or Firm* — Laurence A. Greenberg; Werner H. Stemer; Ralph E. Locher

(57) ABSTRACT

A circuit arrangement for a current converter has a half bridge with two series-connected power semiconductor switches in each case. The half bridge has a module with a power semiconductor switch in each case, a first DC voltage terminal, a second DC voltage terminal and an AC voltage terminal. A capacitor is connected in parallel with the half bridge and has a first and second capacitor terminals. A first busbar connects the first DC voltage terminal to the first capacitor terminal, and a second busbar connects the second DC voltage terminal to the second capacitor terminal. The first and the second busbars are arranged as to be spatially parallel and electrically insulated from each other. The circuit arrangement has a resistor connected in series with the capacitor, wherein the resistor is arranged in the first and/or second busbar.

12 Claims, 8 Drawing Sheets

(51) Int. Cl.
*H02M 5/458* (2006.01)
*B60L 9/24* (2006.01)

(52) U.S. Cl.
CPC .............. *H02M 5/458* (2013.01); *B60L 9/24* (2013.01); *B60L 2200/26* (2013.01)

(58) Field of Classification Search
CPC .... H02M 1/0095; H02M 1/0067; H02M 1/14; H02M 1/143; H02M 1/15; H02M 1/32; H02M 1/34–348; H02M 1/4233; H02M 5/40; H02M 5/42; H02M 5/44; H02M 5/45; H02M 5/458; H02M 7/00; H02M 7/003; H02M 7/66; H02M 7/68; H02M 7/575; H02M 7/77; H02M 7/217; H02M 7/219; H02M 7/42; H02M 7/44; H02M 7/521; H02M 7/53; H02M 7/5387; H02M 7/162; B60L 9/00; B60L 9/12; B60L 9/24; B60L 9/26; B60L 9/28; B60L 2200/00; B60L 2200/26
USPC .............. 323/212, 218, 219, 271, 282, 351; 363/15–21.03, 35, 37, 40–43, 50–58, 363/65–72, 123, 131–134, 146, 147
See application file for complete search history.

(56) References Cited

U.S. PATENT DOCUMENTS

| | | |
|---|---|---|
| 2017/0214312 A1 | 7/2017 | Schmitt |
| 2020/0281087 A1* | 9/2020 | Schmid .............. H05K 7/14329 |
| 2021/0119551 A1 | 4/2021 | Henkel et al. |

FOREIGN PATENT DOCUMENTS

| | | | |
|---|---|---|---|
| JP | 2012210153 A | * 10/2012 | ............ H02M 7/003 |
| WO | 2015072060 A1 | 5/2015 | |

OTHER PUBLICATIONS

English translation of CN-101826837-A. (Year: 2010).*
Translation of JP-2012210153-A. (Year: 2012).*
Burkard J et al: "Paralleling GaN switches for low voltage high current half-bridges", 2019 IEEE Energy Conversion Congress and Exposition (ECCE), IEEE, Sep. 29, 2019 (Sep. 29, 2019), pp. 3245-3252, XP033666619, DOI: 10.1109/ECCE.2019.8912830— Published in English.

* cited by examiner

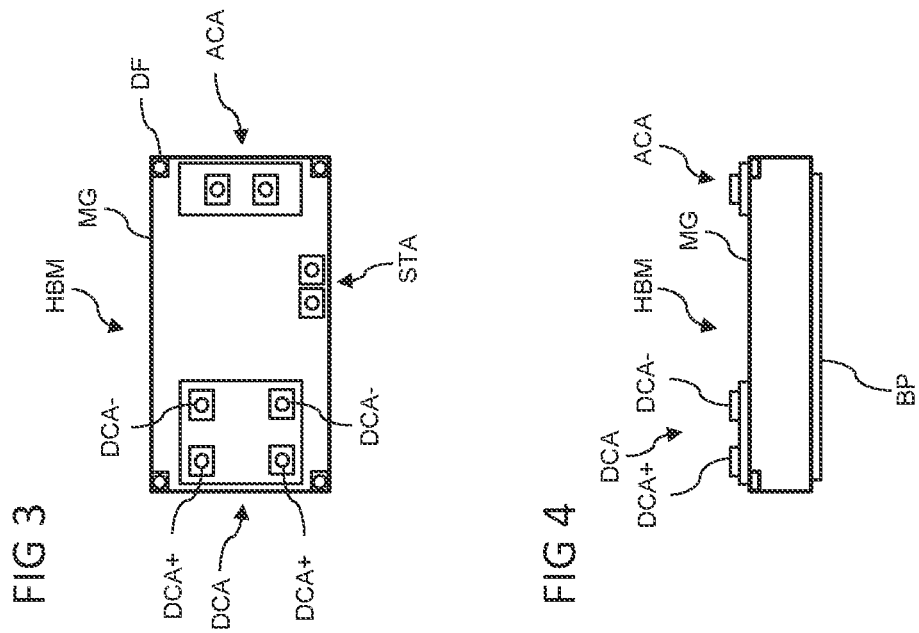
FIG 3
FIG 4
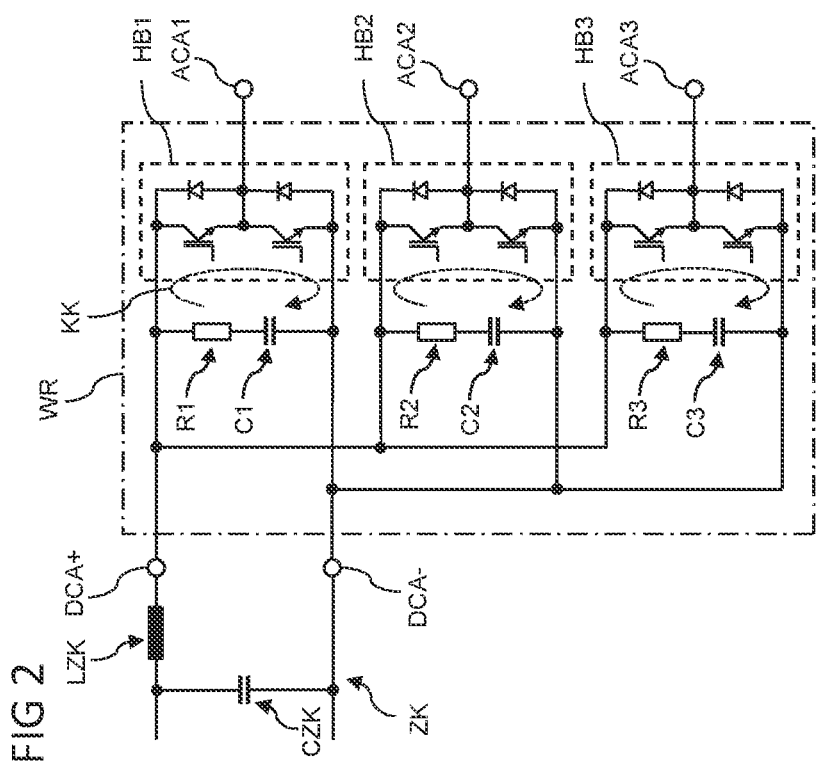
FIG 2

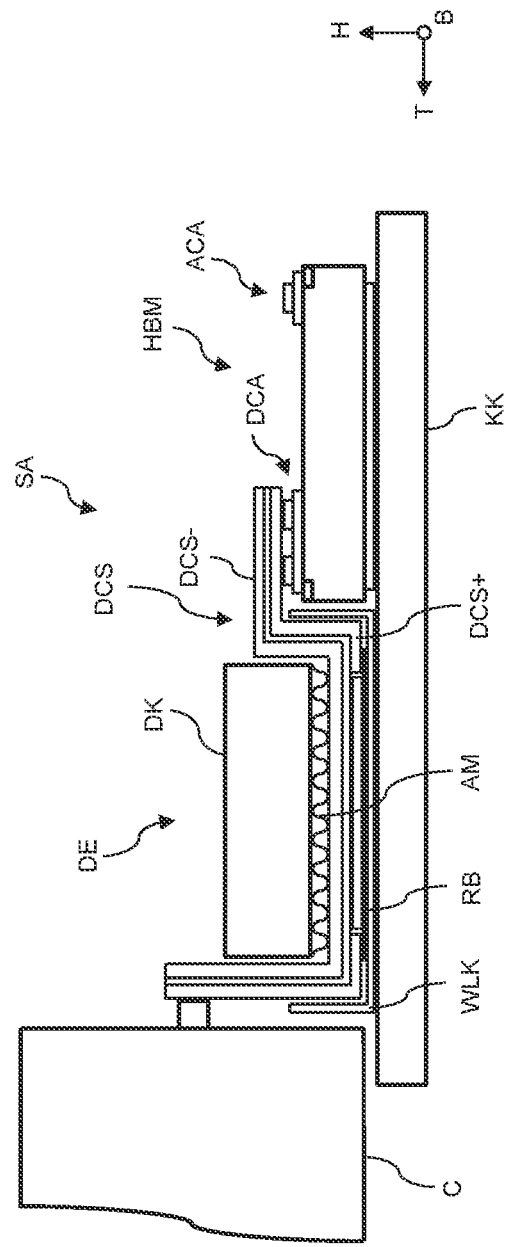

CIRCUIT ARRANGEMENT FOR A CURRENT CONVERTER

CROSS-REFERENCE TO RELATED APPLICATION

This application claims the priority, under 35 U.S.C. § 119, of German Patent Application DE 10 2021 203 996.0, filed Apr. 21, 2021; the prior application is herewith incorporated by reference in its entirety.

FIELD AND BACKGROUND OF THE INVENTION

The invention relates to a circuit arrangement for a current converter, a current converter having such a circuit arrangement, and a rail vehicle having such a current converter.

In rail vehicles in particular, current converters are used to convert electrical energy that is provided via an overhead line or a third rail of a supply network into AC and DC voltages that are adapted to consumer devices of the rail vehicle, including traction motors and electrically operated auxiliary units. When the rail vehicle is supplied via an overhead line with AC voltages of 15 kV at 16.7 Hz or 25 kV at 50 Hz, which are typical in Europe, voltage conversion to a lower voltage level is usually performed initially by a transformer. In this case, a primary side of the transformer is connected via a pantograph to the supply network, for example an overhead line, and a secondary side of the transformer is connected to a supply-side current converter. This supply-side current converter is embodied for example as a so-called four-quadrant converter (4QC), which converts the transformed supply-side AC voltage into a DC voltage on the output side. The supply-side current converter feeds an intermediate circuit on its output side, the aim of the intermediate circuit being to achieve a constant DC voltage irrespective in particular of supply-side fluctuations in the voltage level. The DC voltage intermediate circuit is further connected to a current converter on the load side. This load-side current converter is configured for example as a pulse width modulated inverter (PWM inverter), which converts the intermediate circuit DC voltage into a three-phase AC voltage of variable frequency and variable voltage level, by means of which one or more traction motors of the rail vehicle are fed. Alternatively or additionally, a load-side current converter connected to the DC voltage intermediate circuit can also provide an AC voltage of constant frequency and constant voltage level for the supply of auxiliary units of the rail vehicle for example.

When the rail vehicle is supplied via an overhead line or a third rail with DC voltages of 750 V, 1.5 kV or 3 kV, which are likewise typical in Europe, a load-side current converter can also be fed directly via a filter circuit consisting of a capacitor and a reactor or, particularly in the case of a so-called multisystem rail vehicle, the DC voltage intermediate circuit can be fed directly or via a DC/DC converter (or DC/DC controller) depending on its selected voltage level. The DC voltage intermediate circuit can equally be fed from an electrical energy source which is arranged in the rail vehicle, for example a traction battery and/or a fuel cell which is again connected directly or via a DC/DC converter (or DC/DC controller) to the DC voltage intermediate circuit.

For the voltage conversion, controllable power semiconductor switches such as IGBTs (Insulated Gate Bipolar Transistor) or MOSFETs (Metal Oxide Semiconductor Field Effect Transistor) based on silicon or increasingly on silicon carbide (SiC) or gallium nitride (GaN) are normally used in current converters. These are configured in the form of a respective half bridge for example consisting of two power semiconductor switches connected in series with, if necessary, an antiparallel-connected freewheeling diode for backward conductivity in each case, in a module which is subsequently referred to as a half bridge module. Such a half bridge module has a sealed module package which provides the power semiconductor switches with protection against environmental influences in particular and also against contact. As an alternative to such a half bridge module, a half bridge can also be realized by means of two single-switch modules, each having a power semiconductor switch and optionally an antiparallel-connected freewheeling diode in a respective module package, by connecting terminals of the two single-switch modules together in a suitable manner.

Particularly in traction applications of current converters, for example a pulse width modulated inverter for feeding one or more three-phase traction motors of a rail vehicle, use is made of so-called IHM modules (IGBT High-Power Module) with power semiconductor switches having a reverse voltage of 1.7 kV or 3.3 kV and 1 HV modules (IGBT High-Voltage Module) with power semiconductor switches having a reverse voltage of 6.5 kV. A module or module package has a plurality of electrical terminals which are connected to busbars or lines, for example by means of a screw connection or a cheese head screw, and one or more control terminals which are connected to control lines for controlling the power semiconductor switches. A module package also has a base plate made of an AlSiC material for example, which is so connected as to be electrically insulated but thermally conductive in relation to the power semiconductor switch or switches. The base plate is thermally connected to a heat sink in order to carry dissipated heat that is produced during operation of the current converter out of the module package. Such a heat sink is usually made from an aluminum material, on whose plane upper side are arranged a plurality of modules and optionally further components of the current converter that have to be cooled. By contrast, the lower side of the heat sink can feature a multiplicity of cooling ribs through which cooling air can flow for the purpose of carrying heat away. As an alternative to air cooling, the heat sink can also be designed for liquid cooing, the heat sink then having cooling channels through which a cooling liquid flows.

A half bridge module or correspondingly interconnected single-switch modules have DC voltage terminals which are connected via DC busbars to a DC voltage intermediate circuit, such that a positive and a negative electric potential or frame potential are applied to these during operation of the current converter. A half bridge module also has an AC voltage terminal which is connected to the shared nodes of the two power semiconductor switches, and which is connected via an AC busbar or an AC line to a load, for example a phase of the stator winding of a traction motor. In order to feed a three-phase stator winding, for example three half bridge modules in the exemplary pulse width modulated inverter are connected in parallel to the DC voltage intermediate circuit, each of the three phases of the stator winding being connected to a respective AC voltage terminal of a half bridge module. In order to increase the power of the current converter, it is also possible to connect a plurality of half bridge modules in parallel for each phase of the stator winding. For example, European patent EP 3 404 818 B1 (corresponding to U.S. patent publication No. 2021/0119551) discloses the connection of identical DC voltage terminals of multiple spatially distanced half bridge modules by means of a respective DC voltage busbar configuration. The busbars for the positive and the negative electric potential of the DC voltage intermediate circuit are arranged one above the other in this case, whereby these are only slightly inductive or exhibit only slight parasitic inductance. In the same way, the AC voltage terminals of the multiple half bridge modules of a phase are also interconnected by means of an AC voltage busbar configuration.

Current converters with a DC voltage intermediate circuit usually have one or more capacitors as energy stores in the intermediate circuit, these being used in particular to smooth voltage ripples in the intermediate circuit. A plurality of capacitors may be provided in this case, and arranged in a distributed manner, as disclosed in European patent EP 3 404 818 B1 cited above. Each half bridge module is assigned a capacitor, the capacitors being connected in parallel via the DC voltage busbar configurations in accordance with the plurality of half bridge modules.

With regard to a half bridge or half bridge module and a capacitor connected thereto on the DC voltage side, a commutating circuit (i.e. the current circuit in which the current changes as a result of a switching action of a power semiconductor switch) consists of the two power semiconductor switches of the half bridge, the capacitor and the DC voltage busbar configuration. The switching performance of the power semiconductor switches is affected by the parasitic inductance in the commutating circuit in this case. The DC voltage busbar configuration has a leakage inductance which can be reduced by means of a large-surface design and slightly separated parallel arrangement. A low leakage inductance advantageously results in a reduction in overvoltages when switching the power semiconductor switches, but also results in a higher portion of the commutating current flowing in the capacitor after completion of commutation. If the current converter has a plurality of half bridges or half bridge modules which are connected on the DC voltage side to a respective capacitor and to a shared DC voltage intermediate circuit, and which for example respectively feed a phase of a traction motor on the AC voltage side, the phase-offset clocking of the power semiconductor switches in particular provokes an equalization process during which equalization currents flow between the plurality of capacitors, and these equalization currents disadvantageously give rise to resonant overvoltages at the capacitors.

SUMMARY OF THE INVENTION

The object of the invention is therefore to specify a circuit arrangement by which such resonant overvoltages can be reduced at capacitors that are arranged in a distributed manner.

This object is achieved by the features in the independent claims. Developments of the invention are specified in respective dependent claims.

A first aspect of the invention relates to a circuit arrangement for a current converter, wherein the circuit arrangement has:

at least one half-bridge with two series-connected power semiconductor switches in each case, wherein the half bridge has at least one module with at least one power semiconductor switch in each case, and wherein the half bridge has a first DC voltage terminal, a second DC voltage terminal and an AC voltage terminal, capacitor which is connected in parallel with the half bridge and has a first capacitor terminal and a second capacitor terminal, and at least one first busbar which connects the first DC voltage terminal to the first capacitor terminal, and at least one second busbar which connects the second DC voltage terminal to the second capacitor terminal, wherein the first and the second busbars are so arranged as to be spatially parallel and electrically insulated from each other. The circuit arrangement is characterized in that it also has at least one resistor which is connected in series with the capacitor, wherein the at least one resistor is arranged in the first and/or second busbar.

According to the invention, the circuit arrangement therefore integrates one or more resistors in the commutating circuit of a half bridge, by means of which resonant currents between distributed capacitors as described in the introduction are reduced during operation of a current converter and voltage peaks that occur are attenuated thereby. In particular if a plurality of circuit arrangements are connected in parallel on the DC voltage side, the resistors connected in series with a capacitor in each case have the effect that equalization currents always flow via a plurality of resistors, whereby overvoltages at the capacitors are reduced.

An inventive integration of at least one resistor in the DC voltage busbar configuration advantageously makes it possible to preserve the low-inductance connection of the capacitor to the half bridge, the connection being possible by virtue of the DC voltage busbar configuration. In this case, the arrangement of the resistor in a busbar means that it is realized as a part of the busbar, the part connecting a DC voltage terminal of the half bridge to a capacitor terminal, or as a section of the busbar, the section replacing a length section of the busbar in particular or being arranged between two length sections of the busbar.

The series-connected power semiconductor switches of the half bridge are arranged in a shared module package for example, which has two DC voltage terminals, one AC voltage terminal and a number of control terminals accordingly. Such a module is usually referred to as a half bridge module. Alternatively, the two power semiconductor switches can equally be arranged in a respective module package whose terminals are interconnected in the manner of a half bridge, so that these together again provide DC and AC voltage terminals of a half bridge.

A module package can have a plurality of mechanical terminals for each electrical terminal, such that for example different busbars can be attached to the module package or mechanically connected to the terminals, wherein the busbars connect the module or modules on one hand to the capacitor, and on the other hand to an intermediate circuit of the current converter or to another module. The mechanical attachment of the busbars to the terminals of a module package is effected in this case by means of cheese head screws, for example.

For a low-inductance connection of the capacitor to the half bridge, the first and second busbars are preferably arranged in parallel over at least a significant length. They are preferably arranged one directly above the other in this case, and are only mechanically and electrically separated from each other by a suitable insulating material, for example an insulating film. Depending on the geometry of the DC voltage terminals of the module or modules and of the capacitor terminals, one busbar can have a longer or shorter length than the other busbar or for example a cut-out in the region of a terminal that is assigned to the other busbar.

The AC voltage terminal of the half bridge can also be connected to a further busbar which, for example in the form of an AC voltage busbar configuration, serves a terminal of a motor power cable for a phase of a traction motor as a load that has to be fed by the current converter.

As described in European patent EP 3 404 818 B1 cited in the introduction, for the purpose of increasing the power of the current converter, a plurality of half bridges can be permanently connected in parallel by means of a shared DC voltage busbar configuration and AC voltage busbar configuration. These parallel-connected half bridges can be connected correspondingly via shared first and second busbars to a shared capacitor.

As per the introductory description, power semiconductor switches can take the form of IGBTs or MOSFETs in particular, these being based on silicon, silicon carbide or gallium nitride.

The capacity of the capacitor in the inventive circuit arrangement is so dimensioned as to represent a significant portion of a total capacity of a DC voltage intermediate circuit. In the case of a current converter containing a plurality of circuit arrangements, each of which is connected to a DC voltage intermediate circuit, the capacitors that are arranged in a distributed manner together accordingly represent the total capacity of the DC voltage intermediate circuit as required for the operation of the current converter. Only in specific exceptional cases, for example in the case of a supply network with a significantly fluctuating voltage level, can an additional intermediate-circuit capacitor be provided in the DC voltage intermediate circuit in order to further increase the total capacity. Since such an additional intermediate-circuit capacitor is arranged outside the respective commutating cell of the circuit arrangements, it can be connected with higher inductance, i.e. higher than the inductance of an intermediate circuit, which is significantly higher than the inductance of the commutating cell.

The dimensioning of the capacitor of the circuit arrangement differs from a conventional snubber or snubber component consisting of a series circuit comprising capacitor and resistor as used in high-power current converters in the past. In the case of such a conventional snubber component, the capacity of the capacitor was compatible with the inductance that had to be switched by the semiconductor switch and was therefore usually considerably smaller than the capacity of an intermediate-circuit capacitor, and therefore the capacitor was integrated in a power semiconductor module in particular.

According to a development of the circuit arrangement, the at least one resistor is made from a different material than the busbar in which it is arranged and/or the resistor has a different width or thickness in at least one partial region and/or the resistor has a different shape.

Busbars used in current converters are usually made from a copper material on the basis of low electrical resistance and have a uniform width and thickness over the main length. In this case, the busbars have a uniform width and thickness over their length. A low inductance or a low leakage inductance of the busbar configuration is achieved as described in the introduction by means of a preferably large-surface extent and a slight separation between busbars that are arranged in parallel. A higher electrical resistance in a busbar can therefore be achieved in particular by using a different material than that of the busbar, for example by replacing a section of the busbar with a corresponding section made from the other material, with otherwise largely identical dimensions, such that the two busbars, for a desired low inductance of the busbar configuration, are still arranged in parallel. In particular, stainless steel is suitable as such a different material, having lower electrical conductivity than copper and therefore greater electrical resistance. The resistance which is provided in a busbar can therefore be embodied as a sheet of stainless steel, whose flat dimensions correspond largely to those of the replaced section of the busbar.

Alternatively or in addition to a different material, a higher electrical resistance can also be achieved by means of different dimensions, for example by reducing a width and/or a thickness of the busbar in a section of the busbar, thereby reducing its electrical conductivity and increasing the resistance accordingly. For example, a stainless steel sheet which is less thick but otherwise identical in width to the busbar can be arranged as a resistance in a section of the busbar, this consisting of a copper material. With regard to low leakage inductance, a small thickness with a large width is advantageous in this case, and also encourage efficient heat dissipation of the resistor due to the leakage loss which occurs therein.

A different resistor shape than that of the busbar is also possible as an alternative or in addition to the previously cited embodiments of the resistor. For example, the resistor can have a longer length than the corresponding busbar or busbar section in this case. The previously cited stainless steel sheet therefore has a smaller thickness than the busbar or busbar section and for example a considerably longer length as a result of being folded once or more than once. In the region of the partial sections arranged one on top of the other as a result of the folding, for example a film for reciprocal electrical insulation can be inserted in each case. Alternatively, the stainless steel sheet can equally be provided with an electrically insulating lacquer coating. A different shape can also be achieved by arranging a disk-type resistor in the busbar for example, the disk-type resistor typically having a cylindrical shape with respective electrical terminals on the end faces or on the upper and lower sides.

According to a further development of the circuit arrangement, the busbar in which the resistor is arranged is divided into a first and a second length section, the first busbar section being connected in a first end region to the DC voltage terminal of the half bridge and the second busbar section being connected in a first end region to the capacitor terminal, and the first and second busbar sections having a terminal region in a respective second end region, where they are connected to a respective terminal region of the resistor.

The respective first end region of the two length sections of the busbar is preferably embodied in accordance with a known one-piece busbar, such that the busbar sections in these regions can be mechanically connected to the DC voltage terminal of the half bridge or to the capacitor terminal. By contrast, the respective second end region of the two length sections is embodied in such a way that a mechanical connection to terminals of the resistor is possible in this region. For example, a stainless steel sheet as a resistor has terminal regions which are compatible with the terminal regions of the busbar sections and which are mechanically connected by means of a joining process, for example soldering or welding, to the terminal regions of the busbar sections and thereby create an electrical connection. In order to prevent contact corrosion between the different materials of the busbar and the resistor due to such a joining process, for example a precious metal can first be applied to the terminal regions of the busbar sections.

According to a further embodiment of the circuit arrangement, the at least one resistor is thermally coupled to a heat sink, the heat sink being used in particular to cool the at least one module.

By means of a thermal coupling of the at least one resistor of the circuit arrangement to a heat sink, it is advantageously possible to prevent possible destruction of the resistor, particularly in the case of a pulse-type short-circuit current flowing via the resistor. Such a short-circuit current or impulse discharge of the capacitor occurs for example in the event of a short circuit in the current converter or damage to the capacitor. In a current converter for a rail vehicle with an operating voltage level of the DC voltage intermediate circuit greater than 1 kV, for example a short-circuit current of multiple times 10 kA can flow via the resistor. In this case, a correspondingly dimensioned electrical insulation must also be provided in particular between the resistor and the heat sink, the latter being usually manufactured from metal and in particular an aluminum material, which insulation prevents arcing of any such short-circuit current into the heat sink and ensures that it is drained via the resistor and busbars to a frame potential of the rail vehicle for example. However, heat removal from the resistor is in any case also advantageous during normal operation of the current converter.

As a heat sink for removing heat from the at least one resistor, it is feasible to use for example a heat sink of the current converter, to which modules of the half bridges are mechanically attached and thermally coupled for the purpose of removing heat from the module packages. If a plurality of module packages, as described in European patent EP 3 404 818 B1 cited in the introduction, are adjacently disposed on a surface of a shared heat sink and have a respective spatial separation from the assigned capacitor in each case, the separation being bridged by busbars, the heat sink can be extended to the region of the busbars for example, such that the resistors in the busbars are spatially disposed above the heat sink and can therefore be thermally coupled thereto with ease. Such an extended heat sink can also be used for attaching the capacitors, for example by mechanically attaching suitable holding devices for the capacitors to the heat sink.

A suitable material for both the thermal coupling and electrical insulation is for example a thermosetting composition, which has a high thermomechanical stability and at the same time low weight. This material is therefore to a large extent flexible and can be configured individually, such that it can be adapted to the shape of the resistor or busbar and resistor arranged therein in the region of the separation, in order to electrically insulate this completely from the heat sink in particular. In this case, the resistor need not be arranged directly in the region of the surface of the heat sink, but can have a separation therefrom which is bridged by a suitably shaped heat conducting element made of the thermosetting composition material. If a plurality of modules is adjacently disposed on the surface of the heat sink, such a heat conducting element can also have a length which spans a plurality of resistors, for example. The heat conducting element can also be mechanically attached to the heat sink, for example via suitable screw connections in the region between two resistors in each case, in order to ensure the electrical insulation.

According to a further embodiment of the circuit arrangement based on the previous embodiment, the thermal coupling of the at least one resistor to the heat sink is achieved by means of a mechanical force effect in the region of the resistor, on a side of the resistor which faces away from the heat sink.

In particular in the case of a flat resistor such as for example a stainless steel sheet, the surface of the resistor should be thermally coupled to the heat sink as completely as possible in order to provide optimal heat removal. Since neither such a stainless steel sheet nor that side of a heat sink which faces towards the resistor nor, if present, the upper and lower sides of a heat conducting element are perfectly level or planar due to manufacturing tolerances, the directly or indirectly touching sides of the resistor and of the heat sink or the respective side of the heat conducting element can be enlarged by pressing the components together and the thermal coupling of the resistor to the heat sink can advantageously be increased thereby.

In particular in the case of current converters that are used in vehicles and especially in rail vehicles, it is important in this case for the force effect to remain constant irrespective of movements of the current converter or of vibrations and jolts acting on the current converter, in order to reliably guarantee a good thermal connection over the entire operating period of the current converter, which may be up to 30 years.

The pressing together of the components is achieved by means of a mechanical force effect which preferably acts perpendicularly on that side of the resistor which faces away from the heat sink, and is distributed uniformly over the surface of the resistor. A force effect in this case is provided for example by a pressure device containing at least one first pressure element and at least one equalizing means which is arranged between the first pressure element and the resistor.

The first pressure element can be made for example from an electrically insulating material, for example from a thermosetting composition like the heat conducting element, or from an aluminum material as a suitably designed diecasting or extruded profile. The first pressure element is for example removably connected to the heat sink in a positionally stable manner. In the case of a plurality of adjacently disposed modules on the surface of the heat sink, the first pressure element extends in accordance with the heat conducting element described above, preferably over length which spans a plurality of resistors or busbars, whereby a uniform force effect over the plurality of resistors can advantageously be achieved. A mechanically separable connection to the heat sink can be made, depending on the heat conducting element, in a region between two adjacently disposed resistors or busbars, a similar connection being nonetheless also possible outside the region of the plurality of resistors.

The at least one equalizing means can comprise in particular a plurality of springs, for example spiral springs, diaphragm springs, leaf springs, block springs or zigzag springs which are attached to the first pressure element or are held therein in a positionally fixed manner. The equalizing means are used to distribute a force effect originating from the pressure element uniformly over the surface of the resistor or the busbar. The springs can be made from a metal for example and provided with a plastic coating for electrical insulation in particular. Alternatively, the springs can however also be made from an electrically nonconductive material, for example an elastomer in the form of a cylindrical element.

Additionally, the pressure device can further comprise a second pressure element, this being arranged between the at least one equalizing means and the resistor of the busbar. The second pressure element in this case preferably extends exclusively over that side of the resistor which faces towards the equalizing means and serves additionally to provide a uniform force effect on the surface of the resistor and optionally to electrically insulate the resistor or the busbar with which it is in contact from the first pressure element, which is for example made from an electrically conductive material. Furthermore, in the same way as the first pressure element, the second pressure element can be configured to hold the at least one equalizing means in a positionally fixed manner.

A second aspect of the invention relates to a current converter which has at least one DC voltage intermediate circuit and at least one circuit arrangement as per the first aspect of the invention.

According to a first embodiment of the current converter, during operation of the current converter, a first electric potential of the DC voltage intermediate circuit is present at the first DC voltage terminal of the half bridge and the first busbar, wherein a second electric potential of the DC voltage intermediate circuit is present at the second DC voltage terminal of the half bridge and the second busbar, and wherein the first DC voltage terminal and the second DC voltage terminal of the half bridge are connected via a respective further busbar to the DC voltage intermediate circuit.

The module package of a half bridge module can in this case have further mechanical terminals of the first and second DC voltage terminals, to which the further busbars are mechanically attached for the electrical connection to the DC voltage intermediate circuit, for example again by cheese head screws.

For a low inductance or low leakage inductance in this case, the further busbars can be arranged in parallel with a large-surface design and slight separation from each other as per a busbar configuration described in the introduction. Such a further busbar configuration is preferably used to connect a plurality of circuit arrangements, for example for feeding a three-phase stator winding of a traction motor, in parallel with the DC voltage intermediate circuit.

For the purpose of arranging the further busbars, these can be mechanically attached for example to the pressure device, in particular to the first pressure element enclosing the plurality of resistors or busbars, the first pressure element being embodied in a suitable manner accordingly.

According to a further embodiment of the current converter, this additionally has at least three circuit arrangements, the first and second AC voltage terminals of the half bridges being parallel-connected in each case and the modules of the half bridges being arranged in particular on a shared heat sink.

The provision of a capacitor and resistor as components of a respective circuit arrangement advantageously has the effect that resonant currents occurring between the circuit arrangements always flow via a plurality of resistors and are attenuated accordingly.

A coupling inductance between the commutating cell and the DC voltage intermediate circuit can be significantly greater than the parasitic inductances in the DC voltage intermediate circuit. The coupling inductance can be dimensioned such that for example at least seventy percent of a commutating current flows into the capacity of the commutating cell during commutation. Furthermore, the capacity of the commutating cell and of the resistor can be dimensioned such that resonant currents between the capacitors of the circuit arrangements produce an overvoltage at the capacitors of less than or equal to five percent. Furthermore, the capacity of the capacitor of a respective circuit arrangement and of the resistor can be dimensioned such that an effective ohmic overvoltage due to a commutating current is less than five percent. Finally, the resistance value of the at least one resistor of the circuit arrangement can be dimensioned such that in the event of a short circuit in the DC voltage intermediate circuit, more than ten percent of the electrical energy stored in the DC voltage intermediate circuit can be converted into heat in the at least one resistor.

A third aspect of the invention relates lastly to a vehicle, in particular rail vehicle, which has at least one current converter as per an embodiment of the second aspect of the invention.

Such a current converter can be designed as for example a pulse width modulated inverter for feeding a load such as for example one or more traction motors of the vehicle with a three-phase AC voltage of variable frequency and variable voltage level or for example one or more auxiliary units of the vehicle with a three-phase AC voltage of constant frequency and constant voltage level.

Other features which are considered as characteristic for the invention are set forth in the appended claims.

Although the invention is illustrated and described herein as embodied in a circuit arrangement for a current converter, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE FIGURES

FIG. 2 is an equivalent circuit diagram of a current converter;
FIG. 3 is a plan view of a half bridge module;
FIG. 4 is a side view of the half bridge module as per FIG. 3;
FIG. 13 is a side view of a fifth embodiment variant of the circuit arrangement with a pressure device of alternative design to the fourth embodiment variant.

DETAILED DESCRIPTION OF THE INVENTION

For reasons of clarity, the same reference signs are used in the figures for identical components or components which act in an identical or nearly identical manner.

Figure 1:
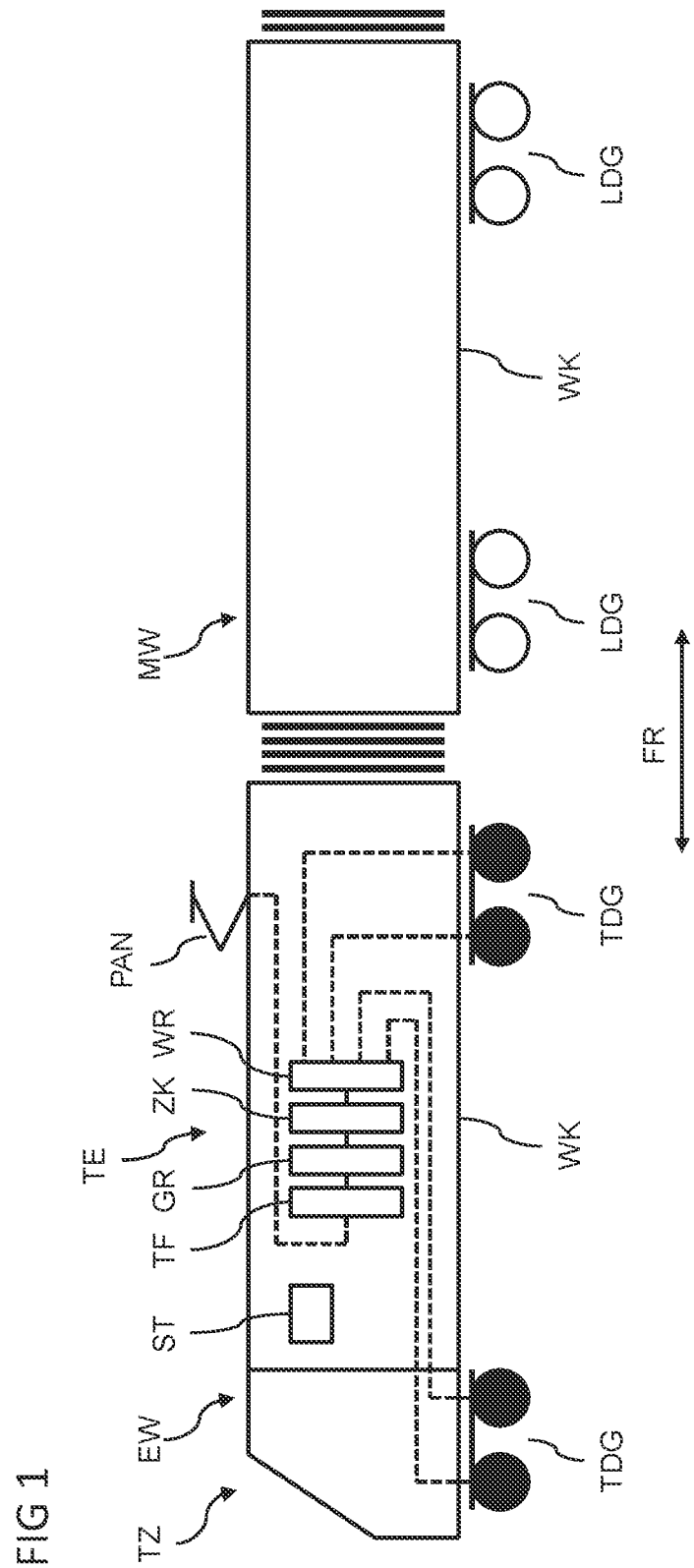
FIG. 1 is an illustration of a rail vehicle.

Referring now to the figures of the drawings in detail and first, particularly to FIG. 1 thereof, there is shown schematically an exemplary rail vehicle in a side view. The rail vehicle illustrated by way of example is configured as a motor coach TZ for the transportation of passengers in multiple cars, only one end car EW and one center car MW coupled thereto being illustrated. Both cars have a vehicle body WK with a respective passenger compartment, this being supported via bogies in the form of motor bogies TDG or load-bearing bogies LDG on rails (not illustrated).

Components of the traction device TE of an electrically operated rail vehicle are schematically indicated in the end car EW. These are usually arranged in specific regions within the vehicle body, in the underfloor region, in the roof region or even distributed over a plurality of cars. Further components of the traction device, for example a traction battery, and auxiliary units required for operation of the components may also be provided, but are not specifically illustrated in FIG. 1.

The traction device TE can be electrically connected to an overhead line (not shown) of a traction power supply network via a pantograph PAN arranged in the roof region of the end car EW, the overhead line in the example carrying a single-phase AC voltage. This AC voltage is delivered to a supply-side primary winding of a transformer TF, in which the supply-side voltage level is stepped down from for example 15 kV or 25 kV to a suitable voltage level for the intermediate circuit ZK. A secondary winding of the transformer TF is connected to a supply-side current converter, for example a rectifier GR or four-quadrant converter, which rectifies the AC voltage.

The supply-side current converter GR feeds a DC voltage intermediate circuit ZK, which in turn feeds a load-side current converter WR, for example an inverter or pulse width modulated inverter. From the DC voltage, the pulse width modulated inverter generates for example a three-phase AC voltage of variable frequency and amplitude, which is used to feed the three-phase stator windings of traction motors. In the example according to FIG. 1, an inverter WR feeds four traction motors which are arranged in two motor bogies TDG of the end car EW. The function of in particular the supply-side current converter GR and the load-side current converter WR is controlled in a known manner by a control device ST.

Alternatively, the overhead line or for example a third rail can also carry a DC voltage. In this case, the intermediate circuit ZK of the traction device TE can be fed directly or via a line filter containing a reactor and a capacitor, and if applicable a DC/DC converter. So-called multisystem vehicles have for example both a pantograph for a supply-side AC voltage supply and a pantograph for a DC voltage supply, these being connected accordingly to the transformer and the intermediate circuit of the traction device respectively.

FIG. 2 shows the equivalent circuit diagram of the load-side inverter WR from FIG. 1 as an exemplary current converter. The inverter WR is connected on the input side via DC voltage terminals DCA+, DCA− to a DC voltage intermediate circuit ZK and on the output side via AC voltage terminals ACA1, ACA2, ACA3 to three phases of stator windings of one or more traction motors. Provision is made in the intermediate circuit ZK for example for an intermediate-circuit capacitor CZK connected in parallel with the inverter WR and an intermediate-circuit inductor LZK connected in series with the inverter WR. As described above, this intermediate-circuit capacitor CZK is not required for the normal operation of the traction device TE of the rail vehicle TZ, but can be provided in particular for additional stabilization of the intermediate circuit voltage if the voltage level of the supply network varies significantly.

The inverter WR has three half bridges HB1, HB2, HB3 which are connected in parallel to the DC voltage intermediate circuit ZK and which are arranged for example in a respective half bridge module HBM as illustrated in FIG. 3 and FIG. 4. As an alternative to a half bridge module HBM, provision can equally be made for single-switch modules which are interconnected to form a respective half bridge. Each half bridge HB1, HB2, HB3 contains two power semiconductor switches connected in series with a freewheeling diode which is antiparallel-connected in each case, allowing regenerative energy that is generated by the traction motors to be fed back for example into the supply network or into a traction battery that is connected to the DC voltage intermediate circuit.

Arranged in parallel with each half bridge HB1, HB2, HB3 is a respective capacitor C1, C2, C3 with a series-connected resistor R1, R2, R3 in each case. As an alternative to the illustrated arrangement of the resistor, in which this is connected to the positive electric potential of the DC voltage intermediate circuit ZK, the respective resistor can also be connected to the negative electric potential or frame potential of the DC voltage intermediate circuit ZK. An arrangement of two resistors at both terminals of the capacitor and of the DC voltage intermediate circuit ZK is also conceivable. As indicated by the broken line, a commutating circuit KK consists of the power semiconductor switches of the respective half bridge HB1, HB2, HB3 together with the respective capacitor C1, C2, C3 and the respective resistor R1, R2, R3.

Further electrical or optical lines and terminals that are required to control the power semiconductor switches are not specifically illustrated in FIG. 2.

FIG. 3 schematically shows a half bridge module HBM in a plan view and FIG. 4 the half bridge module HBM in a side view. This is essentially constructed in the same way as an IHM or IHV module described in the introduction. Such a half bridge module HBM usually has a cuboid low inductance package MG in which the power semiconductor switches and the antiparallel-connected freewheeling diodes are arranged. DC voltage terminals DCA, AC voltage terminals ACA and control terminals STA are arranged on an upper side of the module package. The DC voltage terminals DCA, specifically multiple instances of each, are embodied in the region of one end face of the module package MG, wherein both a DC busbar for the electrical connection to the capacitor and a DC busbar for the electrical connection to the DC voltage intermediate circuit can be mechanically attached to each by means of a screw connection. The AC voltage terminal ACA of the half bridge module HBM, there being for example multiple instances thereof, is likewise embodied in the region of the other end face of the module package MG and thus allows a mechanical connection to an AC busbar. Also arranged in the region of a longitudinal side of the module package MG are for example control terminals STA to which for example control lines can be mechanically connected for the purpose of activating the power semiconductor switches of the half bridge from a control device ST. Four feedthroughs DF in the corner regions of the module package MG are used for mechanical attachment of the module package MG to a heat sink by means of screw connections for example. On its lower side, the module package MG also has a base plate BP which is thermally connected to the heat sink in order to carry heat away from the module package MG, the heat being is produced as a result of switching losses in the power semiconductor switches during operation of the half bridge module HBM.

Figure 5:
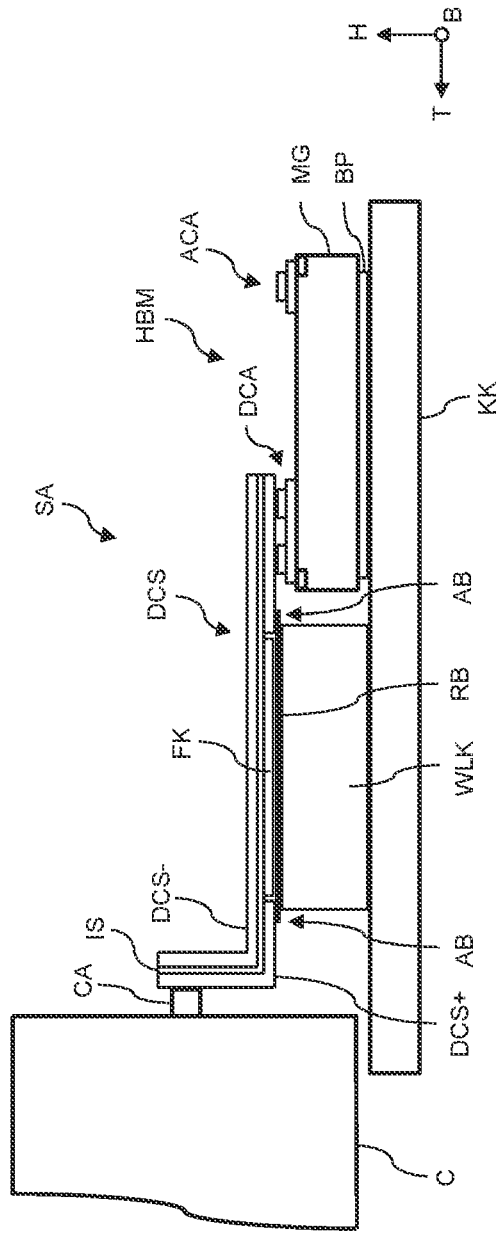
FIG. 5 is a side view of a first embodiment variant of the circuit arrangement.

FIG. 5 shows a first exemplary embodiment variant of a circuit arrangement SA in a side view. The half bridge module HBM as per FIG. 3 and FIG. 4 is arranged on the planar upper side of a heat sink KK and is thermally connected thereto via the base plate BP of the module package MG. The heat sink KK is made from an aluminum material, in particular as an extruded profile, and can additionally for example have cooling fins on the lower side or even internal cooling channels (not shown). A height H of the heat sink KK is so dimensioned as to have both high mechanical stability and sufficient heat capacity, for example. The heat sink KK also has a width B which allows the arrangement of a plurality of half bridge modules HBM, for example at least three half bridge modules HBM corresponding to an inverter WR as per FIG. 2, adjacent to each other on the upper side. In depth T, the heat sink KK extends beyond the half bridge module HBM. A capacitor C is arranged in the region of that side of the heat sink KK which is situated opposite the half bridge module HBM, the capacitor C being attached to the heat sink KK by means of a holding device (not shown), wherein a thermal coupling to the heat sink KK is not necessary. The capacitor C has for example a cylindrical housing, on one end face of which are arranged two capacitor terminals CA.

The DC voltage terminals DCA of the half bridge module HBM are connected to the capacitor terminals CA via a low-inductance DC voltage busbar configuration DCS. The busbar configuration in this case comprises two flat busbars DCS−, DCS+ which are arranged in parallel, made from a copper material of a respective thickness, and electrically insulated from each other by an insulation layer IS, for example a film or even a suitable lacquer coating. A first of the two busbars DCS− is connected in this case to the first DC voltage terminals DCA− of the half bridge module HBM, while the second busbar DCS+ is connected to the second DC voltage terminals DCA+ of the half bridge module HBM. During operation of the circuit arrangement SA or inverter, the first DC voltage terminals DCA− are on a negative voltage level DC− of the intermediate circuit ZK according to the equivalent circuit diagram as per FIG. 2, the second DC voltage terminals DCA+ being on a positive voltage level DC+ of the intermediate circuit ZK correspondingly.

In the first embodiment variant and in the further embodiment variants, the capacitor C is arranged horizontally in each case, the capacitor terminals CA pointing in the direction of the half bridge module HBM. Since the DC voltage terminals DCA of the half bridge module HMB are however arranged on the upper side of the module package MG, the DC voltage busbar configuration DCS is for example bent in the region of the capacitor terminals CA, wherein a specific radius can be provided in the transition between the horizontal plane (in the illustration) and the vertical plane. The DC voltage busbar configuration DCS in this embodiment variant therefore has an L-shaped profile. A different arrangement of the capacitor C than that in the illustration is equally possible, for example such that the capacitor terminals CA are arranged in the same plane as the DC voltage terminals DCA of the half bridge module HBM.

The busbars DCS−, DCS+ are mechanically connected to the DC voltage terminals DCA−, DCA+ and the capacitor terminals CA by means of for example a screw connection in each case, wherein these screw connections are not specifically illustrated. To this end, the terminals each have a screw thread for example. Correspondingly, a further DC voltage busbar configuration for the connection to the DC voltage intermediate circuit is also mechanically connected to the further DC voltage terminals DCA of the half bridge module HBM, and a further busbar is mechanically connected to the AC voltage terminals ACA of the half bridge module HBM, the mechanical connections being affected by means of respective screw connections which are likewise not specifically illustrated. The further DC voltage busbar configuration can be arranged above the DC voltage busbar configuration DCS in this case, and in particular separated and electrically insulated therefrom, but nonetheless mechanically attached together with the DC voltage busbar configuration to the DC voltage terminals DCA of the half bridge module HBM.

The second busbar DCS+ of the DC voltage busbar configuration DCS is divided into two length sections, a first length section being connected in a first end region to the second DC voltage terminals DCA+ of the half bridge module, and the second length section being connected in a first end region to a second capacitor terminal CA+. The second end regions of the two length sections are separated from each other. A resistor RB in the form of a flat sheet is arranged in the region of this separation. The resistance sheet RB is made from a stainless steel material for example and has an identical width but a smaller thickness in comparison with the second busbar DCS+. Stainless steel is particularly suitable as a damping resistance, since it has a higher electrical resistance than copper and withstands adiabatic heating with adequate thermal capacity. In the end regions, the resistance sheet RB has respective terminal regions which are connected to corresponding terminal regions AB of the first and second length sections of the second busbar DCS+ in their respective second end regions. The respective terminal regions AB of the length sections and of the resistance sheet RB can overlap in this case, as illustrated, and can be connected together mechanically in the region of the respective overlap by means of a known joining process, for example soldering or welding, such that a lastingly stable electrical connection is created.

The resistance sheet RB is embodied for example as a single layer. Alternatively, it can however be folded once or more than once, whereby a greater length and correspondingly a higher resistance can be achieved. Those sections of the resistance sheet which are adjacent due to the folding can in this case be arranged for example in the region of the space that is formed by the separation between the length sections of the second busbar DCS+. The sections must be electrically insulated from each other accordingly, this again being possible by means of a respective insulation layer in the form of a film or lacquer coating.

The space between the second end regions of the two length sections of the second busbar DCS+ is not essentially filled in the case of the resistance sheet RB, which is embodied as a single layer by way of example. In order to prevent any curvature of the resistance sheet RB into the space and to allow a mechanical pressure to be applied onto the resistance sheet RB or the DC voltage busbar configuration DCS in the direction of the heat sink KK, a packing FK made from a polymer material, for example a thermosetting composition, is arranged in the space. This material is electrically insulating but thermally conductive and has a high mechanical stability even when heated.

The mechanical pressure in the direction of the heat sink KK allows the resistance sheet RB to rest homogenously over a large area on a heat conducting element WLK in order to create a large-surface thermal coupling thereto and thus allow efficient heat dissipation of the resistance sheet RB into the heat sink KK, whereby an ability of the resistance sheet RB to withstand short circuits can be achieved. The heat conducting element WLK is arranged spatially between the resistance sheet RB and the heat sink KK and has a width and depth which are respectively adapted to the dimensions of the resistance sheet RB. Like the packing FK, the heat conducting element WLK is made from a polymer material, for example a thermosetting composition, the particular properties of a thermosetting composition being advantageously utilized here likewise.

Figure 6:
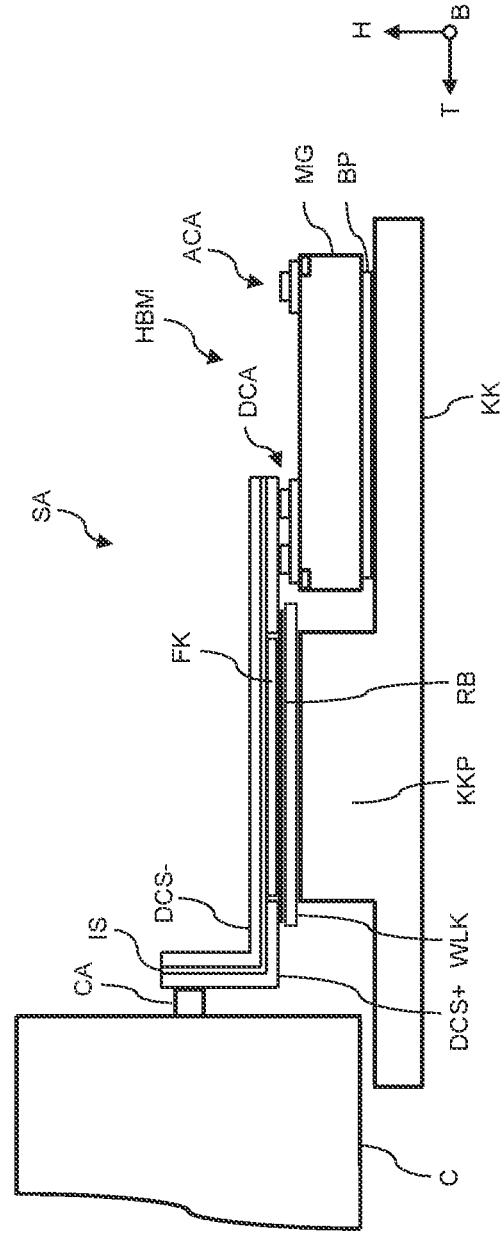
FIG. 6 is a side view of the circuit arrangement as per FIG. 5 with a heat sink which is developed differently.

FIG. 6 shows the circuit arrangement SA as per FIG. 5 with a differently shaped heat sink KK and heat conducting element WLK. In this case, the heat sink KK in the region of the resistance sheet RB or the heat conducting element WLK has a greater height H than the surrounding upper side of the heat sink KK, particularly that region of the upper side in which the half bridge modules HBM are arranged, thereby forming a heat sink platform KKP. When manufacturing the heat sink KK as an extruded profile from an aluminum material, such a raised portion can easily be produced in the same way as for example cooling fins on the underside by adapting the profile shape, the raised portion then extending over the whole width B of the heat sink KK. It is advantageously possible by means of the heat sink platform KKP, in comparison with a voluminous heat conducting element WLK made from a thermosetting composition as per FIG. 5, to configure the heat removal from the resistance sheet RB more efficiently due to a better thermal conductivity of the aluminum material, the thermal capacity of the heat sink KK likewise being further increased as a result of the greater volume. Provision is still made between the heat sink platform KKP and the resistance sheet RB for a heat conducting element WLK which electrically insulates the resistance sheet RB or the DC voltage busbar configuration DCS from the heat sink KK in order to prevent arcing of high-voltage pulses into the heat sink KK, and which thermally couples the resistance sheet RB to the heat sink KK. This heat conducting element WLK can have considerably less height and for example have a shape which is similar to the packing FK. Furthermore, the heat conducting element WLK can be mechanically attached to the heat sink platform KKP by means of a screw connection, for example.

Figure 7:
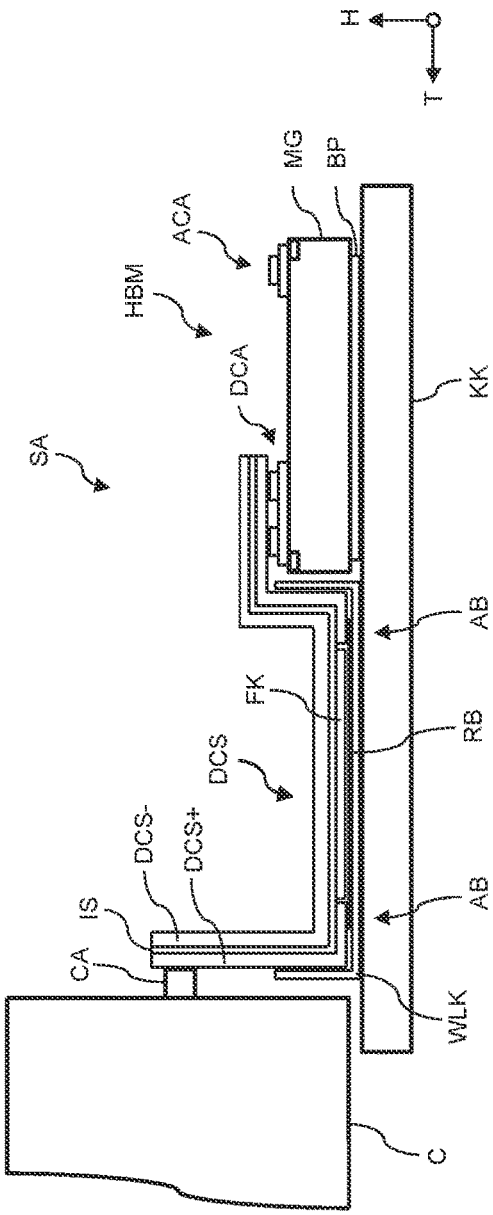
FIG. 7 is a side view of a second embodiment variant of the circuit arrangement.

FIG. 7 shows a second exemplary embodiment variant of a circuit arrangement SA in a side view. Unlike the previously described first embodiment variant, the DC voltage busbar configuration DCS has a U-shaped or well-shaped profile starting from the half bridge module HBM, the busbars DCS−, DCS+ over a specific depth T and in the region of the separation between the half bridge module HBM and the capacitor C being arranged close to the upper side of the heat sink KK or having less height H relative thereto. The heat conducting element WLK can therefore have less height H, as per the embodiment in FIG. 6, whereby the removal of heat into the heat sink KK can again be configured more efficiently than in the embodiment according to FIG. 5. In a corresponding manner to the DC voltage busbar configuration DCS, the heat conducting element WLK likewise has a U-shaped or well-shaped profile for example, in order to electrically insulate both the resistance sheet RB and the second busbar DCS+ from the heat sink KK.

Figure 8:
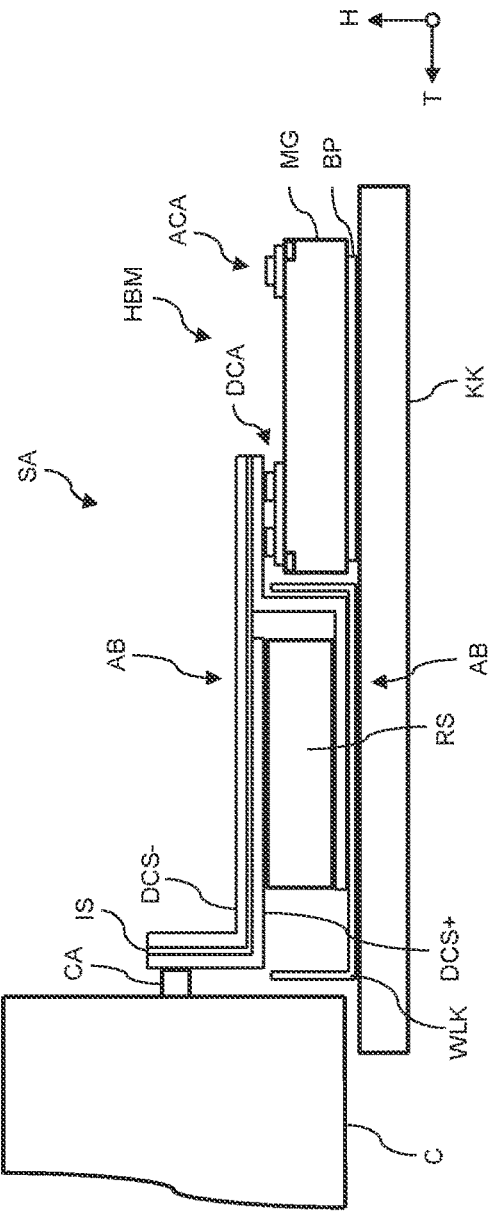
FIG. 8 is a side view of a third embodiment variant of the circuit arrangement with a disk-type resistor.

FIG. 8 shows a third exemplary embodiment variant of a circuit arrangement SA in a side view. In this third embodiment variant, a disk-type resistor RS is arranged in the second busbar DCS+ instead of a resistance sheet RB as per FIGS. 5, 6 and 7. A disk-type resistor RS has a cylindrical body made from a ceramic material for example, whose end faces are each provided with a layer made from an aluminum material for electrical contacting. In the case of a horizontal arrangement of the disk-type resistor RS as per the illustration in FIG. 8, the contacting of the end faces with the second end regions of the two length sections of the second busbar DCS+ takes place above and below the disk-type resistor RS. For this purpose, for example that length section of the second busbar DCS+ which is connected to the semiconductor module HBM is, like the embodiment variant according to FIG. 7, arranged in the region of the upper side of the heat sink KK over a specific length, while that length section of the second busbar DCS+ which is connected to the capacitor C is, like the embodiment variant according to FIG. 5 or FIG. 6, arranged parallel to the first busbar DCS− over a specific length. The length sections are therefore arranged parallel to each other, with a separation between them, over a specific length in the direction of the depth of the heat sink KK. Heat dissipation of the disk-type resistor RS into the heat sink KK takes place over a length section of the second busbar DCS+, which is thermally connected to the heat sink KK but electrically insulated therefrom by a heat conducting element WLK.

Figure 9:
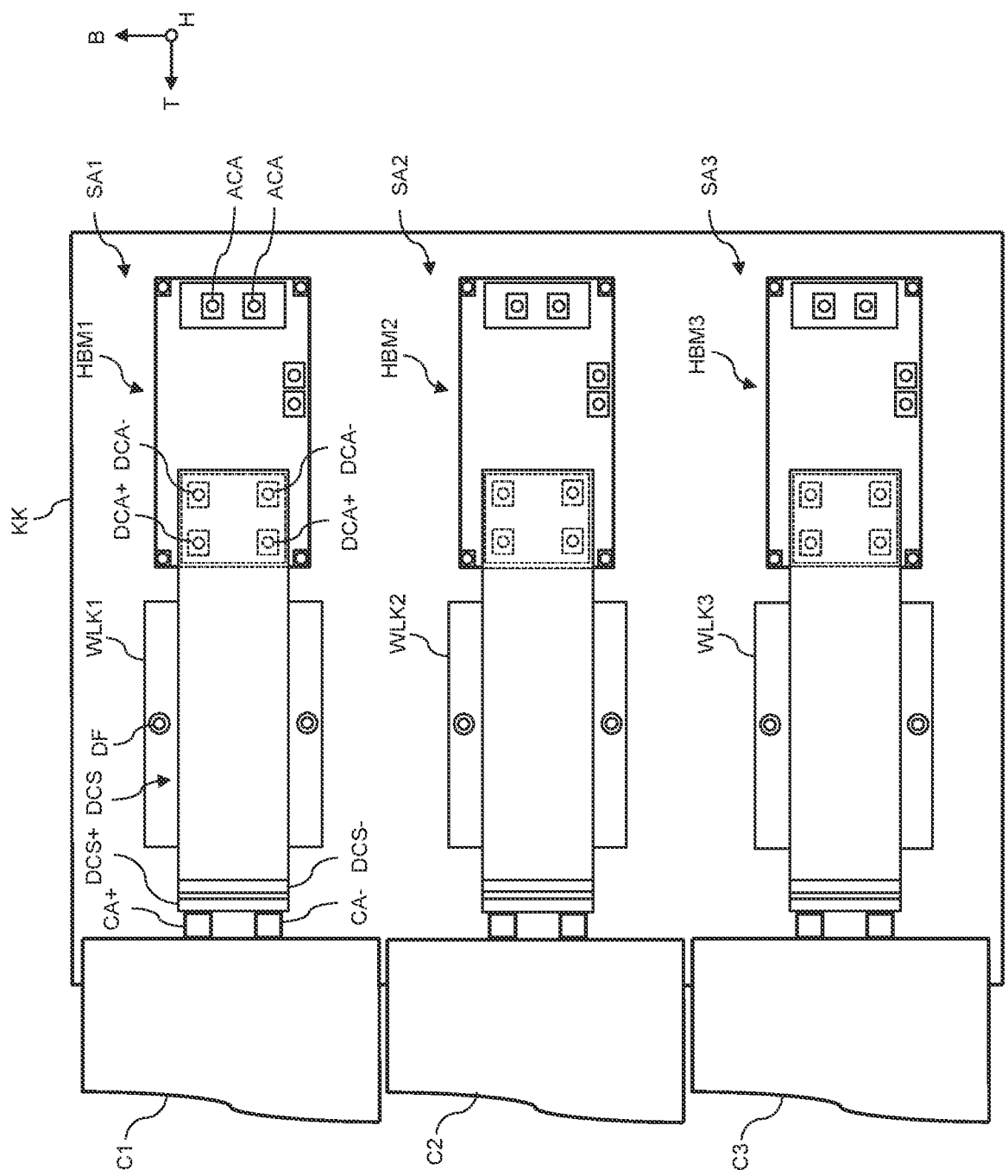
FIG. 9 is a plan view of an arrangement of three circuit arrangements as per the first embodiment variant adjacent to each other on a shared heat sink.

FIG. 9 shows a plan view of an arrangement of three circuit arrangements SA1, SA2, SA3 as per FIG. 5 adjacent to each other on a shared heat sink KK. Together with further busbars (not shown) for a respective connection of the DC voltage terminals DCA+, DCA− of the half bridge modules HBM1, HBM2, HBM3 to the DC voltage intermediate circuit ZK and a respective connection of the AC voltage terminals ACA of the half bridge modules HBM1, HBM2, HBM3 to a respective phase of a stator winding of a traction motor for example, this arrangement corresponds to the basic design of an inverter WR as per the equivalent circuit diagram in FIG. 2.

The illustration according to FIG. 9 non-specifically discloses that the respective first busbar DCS− of the DC voltage busbar configuration DCS is cut out in the region of the DC voltage terminals DCA+ of the respective half bridge module HBM and of the DC voltage terminal CA+ of the respective capacitor C in order to allow contacting of the respective second busbar DCS+ with these terminals. In the same way, the respective second busbar DCS+ is cut out in the region of the DC voltage terminals DCA− of the respective half bridge module HBM and of the DC voltage terminal CA− of the respective capacitor so that the respective first busbar DCS− in these regions can be contacted with the respective terminals. Furthermore, the first heat conducting element WLK1 is provided with feedthroughs DF via which it can be attached to the heat sink KK by means of a screw connection, for example. The further two illustrated circuit arrangements SA2, SA3 are configured in the same way as the first circuit arrangement SA1 described.

Figure 10:
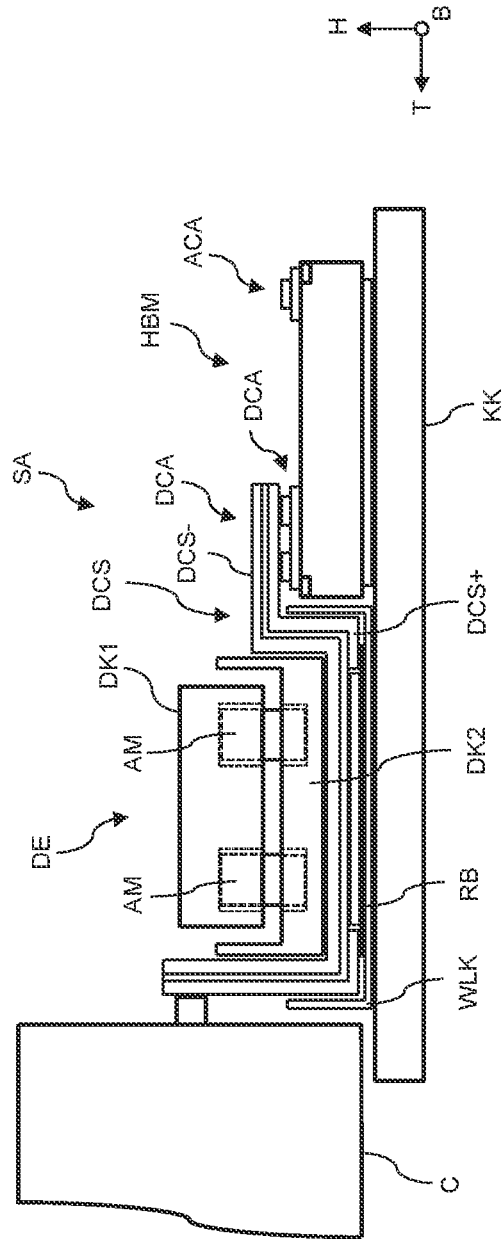
FIG. 10 is a side view of a fourth embodiment variant of the circuit arrangement with an additional pressure device.

FIG. 10 shows a fourth exemplary embodiment variant of the circuit arrangement SA in a side view. This is based on the second embodiment variant as per FIG. 7 and additionally has a pressure device DE by means of which a higher mechanical pressure is generated in the direction of the heat sink KK in order to ensure a reliable and lasting large-surface thermal coupling of the resistance sheet RB to the heat conducting element WLK. This pressure device DE advantageously reduces the load on the DC voltage terminals DCA, CA of the half bridge module HBM and of the capacitor C, which are largely responsible for applying the pressure in the direction of the heat sink KK in the embodiment variant according to FIG. 7.

The pressure device DE for example comprises a first pressure element DK1, a second pressure element DK2 and an equalizing means AM between the first pressure element DK1 and the second pressure element DK2. The second pressure element DK2 (the lower of the two in the illustration) has a U-shaped or well-shaped profile similar to the heat conducting element WLK for example, and is adapted to the profile of the DC voltage busbar configuration DCS. A width of the second pressure element DK2 likewise can also be adapted to the width of the DC voltage busbar configuration DCS. Alternatively, the second pressure element DK2 can have a planar upper side and a greater width than the DC voltage busbar configuration DCS for example, wherein side walls projecting in the direction of the heat sink KK are formed in the overhang regions and enclose the busbars DCS−, DCS+ and in particular the resistance sheet RD and the heat conducting element WLK and thereby laterally stabilize the individual layers that are not mechanically connected together in a fixed manner. The second pressure element DK2 is again made from a polymer material for example, in particular a thermosetting composition.

The second pressure element DK2 has on its upper side for example two cylindrical recesses, in which a first end of a respective equalizing means AM is arranged or held in a positionally fixed manner. The equalizing means AM allow a homogeneous distribution of the pressure that is applied by the first pressure element DK1 onto the second pressure element DK2, whereby any tolerances that may be present in the arrangement of the DC voltage busbar configuration DCS relative to the first pressure element DK1 can be equalized. Various types of springs are suitable as equalizing means AM, for example in particular spiral springs or diaphragm springs, which are usually made from a metal and additionally coated with a plastic, or also block springs made from an elastomer material.

The first pressure element DK1 likewise has two cylindrical recesses, these being located opposite the cylindrical recesses of the second pressure element DK2, in which a second end of the respective equalizing means AM is arranged or held. The first pressure element DK1 is likewise made from a polymer material for example, in particular a thermosetting composition. Alternatively, it can however be made from a metal, in particular as an extruded profile from an aluminum material which has a high and lasting mechanical stability, the cylindrical recesses being additionally formed in the material by means of a machining process. The first pressure element DK1 is so attached to the heat sink KK as to remain stationary, for example, thereby ensuring a stable position.

Figure 11:
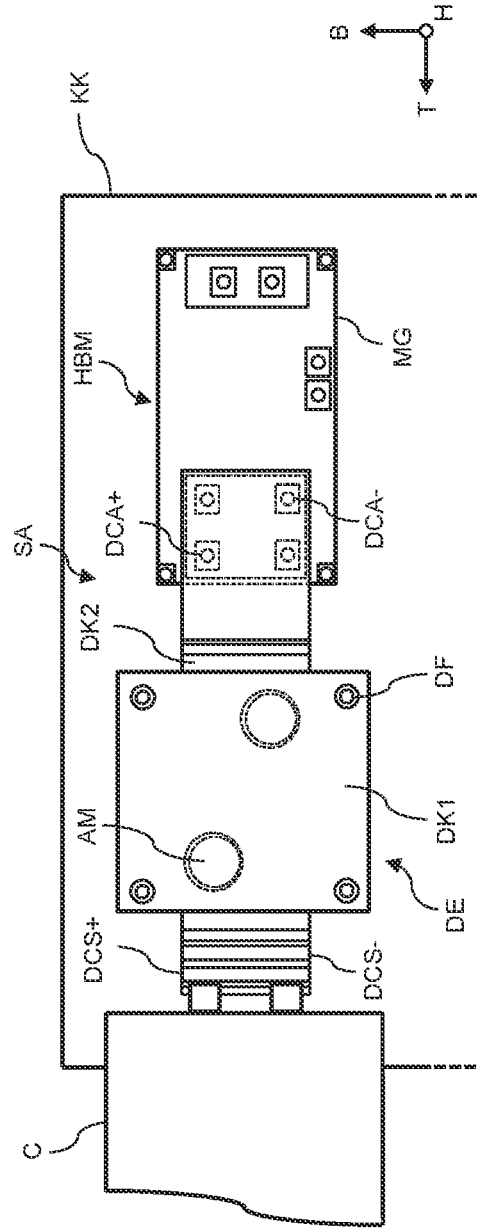
FIG. 11 is a plan view of the fourth embodiment variant.

Such an attachment of the first pressure element DK1 to the heat sink KK is illustrated in FIG. 11 by way of example. FIG. 11 in this case shows the circuit arrangement as per FIG. 10 in a plan view, from which the arrangement of the cylindrical recesses or the equalizing means AM in the first pressure element DK1 can be seen, the arrangement being selected by way of example. It is also clear that the first pressure element DK1 projects beyond the width of the DC voltage busbar configuration DCS in each case and, in the overhang regions, has respective feedthroughs DF which are used to attach the first pressure element DK1 to the heat sink KK by means of a respective screw connection, for example.

Figure 12:
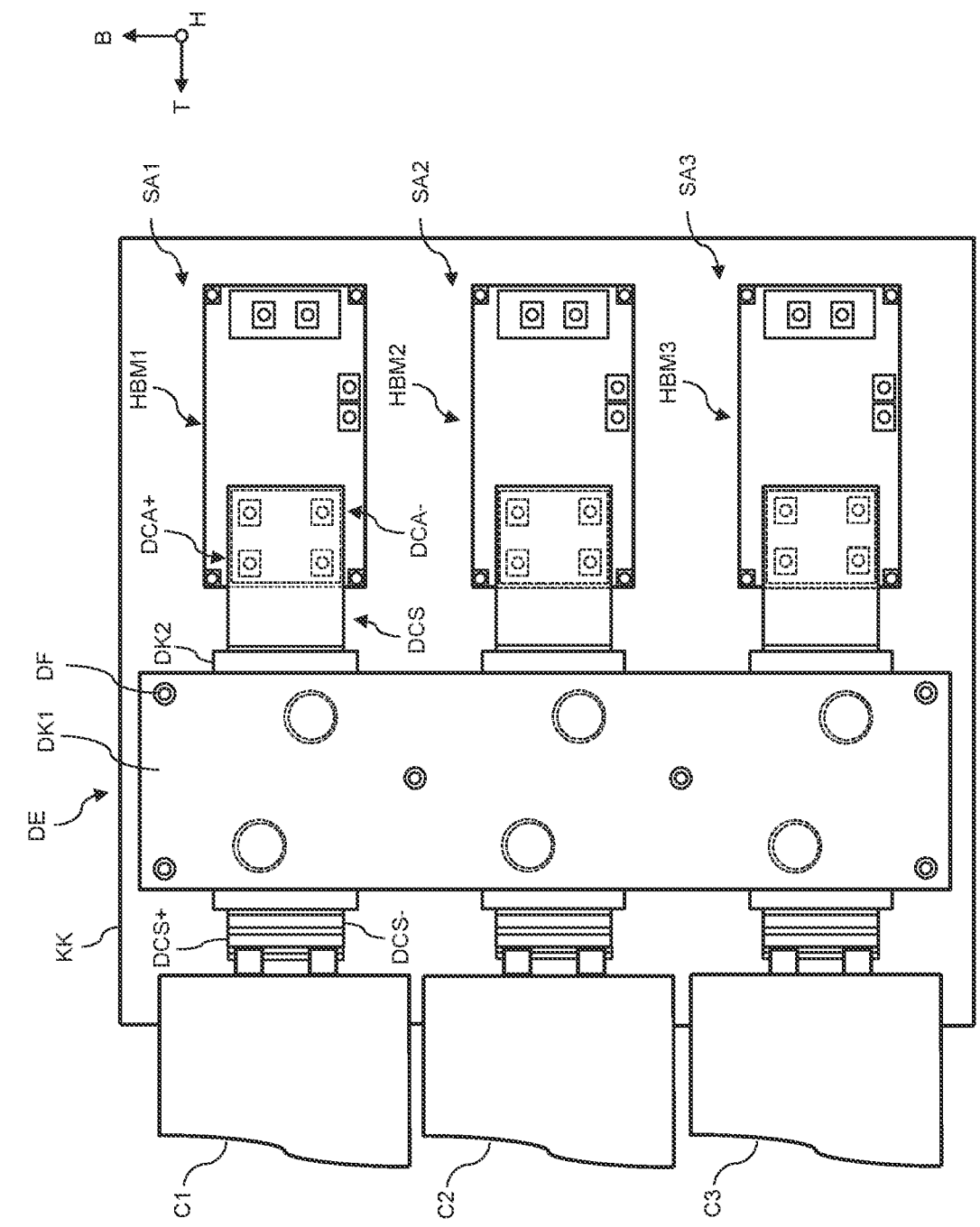
FIG. 12 is a plan view of an arrangement of three circuit arrangements as per the fourth embodiment variant with a first pressure element which spans the three DC voltage busbar configurations.

FIG. 12 shows a plan view of an arrangement of three circuit arrangements SA1, SA2, SA3 as per FIG. 10 adjacent to each other on a shared heat sink KK. The respective second pressure element DK2 has a planar upper side, this differing from the embodiment according to FIG. 10, and has a greater width than the DC voltage busbar configuration DCS, with side walls which project in the direction of the heat sink KK and which laterally enclose the busbars DCS−, DCS+ and in particular the resistance sheet RD and the heat conducting element WLK. As per FIG. 9, the three circuit arrangements SA1, SA2, SA3 together with further busbars (not shown) form an inverter WR. The first pressure element DK1 extends over the DC voltage busbar configurations DCS of all three circuit arrangements SA1, SA2, SA3. Accordingly, the first pressure element DK1 is mechanically attached to the heat sink in the end regions, for example, and additionally if necessary in the regions between the circuit arrangements or DC voltage busbar configurations DCS.

FIG. 13 lastly shows a fifth exemplary embodiment variant of the circuit arrangement SA in a side view. This is again based on the second embodiment variant as per FIG. 7 and differs from the fourth embodiment variant as per FIG. 10 in that its pressure device DE is designed differently. The pressure device in this case consists of a single block-type pressure element DK for example on whose planar lower side is arranged a zigzag spring as an equalizing means AM which ensures a homogenous distribution of the mechanical pressure onto the DC voltage busbar configuration DCS. The zigzag spring preferably extends in the direction of depth T over a significant length within the U-shaped or well-shaped profile of the DC voltage busbar configuration DCS and over the entire width of the DC voltage busbar configuration DCS. The zigzag spring is made from a metal for example while the pressure element DK is made from an electrically insulating material, for example a polymer material, in particular a thermosetting composition. The pressure element DK can extend as per FIG. 11 and FIG. 12 over one or more DC voltage busbar configurations DCS and is mechanically attached to the heat sink KK. Likewise, the pressure element DK can have a greater width than the DC voltage busbar configuration DCS, with side walls which project in the direction of the heat sink KK and which laterally enclose at least the zigzag spring and if applicable additionally the busbars DCS−, DCS+ and the resistance sheet RD and the heat conducting element WLK.

The following is a summary list of reference numerals and the corresponding structure used in the above description of the invention:

AB Terminal region
ACA AC voltage terminal
AM Equalizing means
B Width
BP Base plate
C Capacitor
CA Capacitor terminal
CZK Intermediate-circuit capacitor
DCA DC voltage terminal
DCS DC voltage busbar configuration
DCS+, DCS− Busbar
DE Pressure device
DF Feedthrough
DK Pressure element
EW End car
FK Packing
FR Direction of travel
GR Rectifier
H Height
HB Half bridge
HBM Semiconductor module
IS Insulating layer
KK Heat sink
KKP Heat sink platform
LDG Load-bearing bogie
LZK Intermediate-circuit inductor
MG Module package MW Center car
PAN Pantograph
R Resistor
RB Resistance sheet
RS Disk-type resistor
SA Circuit arrangement
ST Control device
T Depth
TDG Motor bogie
TE Traction device
TF Transformer
TZ Rail vehicle
WK Vehicle body
WLK Heat conducting element
WR Inverter
ZK Intermediate circuit

The invention claimed is:

1. A circuit configuration for a current converter, the circuit configuration comprising:
   at least one half bridge having two series-connected power semiconductor switches in each case, said at least one half bridge defining at least one module with at least one of said power semiconductor switches in each case, said at least one half bridge further having a first DC voltage terminal, a second DC voltage terminal and an AC voltage terminal;
   a capacitor connected in parallel with said at least one half bridge and having a first capacitor terminal and a second capacitor terminal, wherein said capacitor is part of a plurality capacitors disposed in a distributed manner, and wherein the plurality capacitors disposed in the distributed manner together represent a total capacitance of a DC voltage intermediate circuit of the current converter;
   busbars including at least one first busbar connecting said first DC voltage terminal to said first capacitor terminal and at least one second busbar connecting said second DC voltage terminal to said second capacitor terminal, said at least one first busbar and said at least one second busbar disposed as to be spatially parallel and electrically insulated from each other; and
   at least one resistor connected in series with said capacitor, said at least one resistor disposed in one of said busbars;
   said at least one resistor replacing a length section of said first busbar or said second busbar, or said at least one resistor located between two length sections of said first busbar or between two length sections of said second busbar.

2. The circuit configuration according to claim 1, wherein in comparison with said one busbar in which said at least one resistor is disposed, said at least one resistor:
   is made from a different material; and/or
   has a different width and/or thickness in at least one partial region; and/or
   has a different shape.

3. The circuit configuration according to claim 1, wherein said one busbar in which said at least one resistor is disposed is divided into a first and a second length section, wherein said first length section is connected in a first end region to said DC voltage terminal of said at least one half bridge and said second length section is connected in a first end region to said first capacitor terminal, and wherein said first and second length sections have a terminal region in a respective second end region, where they are connected to a respective terminal region of said at least one resistor.

4. The circuit configuration according to claim 1, further comprising a heat sink, said at least one resistor is thermally coupled to said heat sink, wherein said heat sink being used to cool said at least one module.

5. The circuit configuration according to claim 4, wherein thermal coupling of said at least one resistor to said heat sink is achieved by means of a mechanical force effect in a region of said at least one resistor, on a side of said at least one resistor which faces away from said heat sink.

6. The circuit configuration according to claim 1, wherein the plurality capacitors disposed in the distributed manner are not snubber capacitors.

7. A current converter, comprising:
   a DC voltage intermediate circuit having a plurality of capacitors disposed in a distributed manner, said plurality of capacitors disposed in the distributed manner together representing a total capacitance of said DC voltage intermediate circuit of said current converter;
   at least one half bridge having two series-connected power semiconductor switches in each case, said at least one half bridge defining at least one module with at least one of said power semiconductor switches in each case, said at least one half bridge further having a first DC voltage terminal, a second DC voltage terminal and an AC voltage terminal;
   a capacitor connected in parallel with said at least one half bridge and having a first capacitor terminal and a second capacitor terminal, wherein said capacitor is part of said plurality capacitors disposed in the distributed manner;
   busbars including at least one first busbar connecting said first DC voltage terminal to said first capacitor terminal and at least one second busbar connecting said second DC voltage terminal to said second capacitor terminal, said at least one first busbar and said at least one second busbar disposed as to be spatially parallel and electrically insulated from each other; and
   at least one resistor connected in series with said capacitor, said at least one resistor disposed in one of said busbars;
   said at least one resistor replacing a length section of said first busbar or said second busbar, or said at least one resistor located between two length sections of said first busbar or between two length sections of said second busbar.

8. The current converter according to claim 7,
   further comprising a further busbar; and
   wherein during operation of the current converter:
      a first electric potential of said DC voltage intermediate circuit is present at said first DC voltage terminal of said at least one half bridge and said first busbar; and
      a second electric potential of said DC voltage intermediate circuit is present at said second DC voltage terminal of said at least one half bridge and said second busbar, wherein said first DC voltage terminal and said second DC voltage terminal of said at least one half bridge are connected via said further busbar to said DC voltage intermediate circuit.

9. The current converter according to claim 7,
   wherein said at least one half bridge is one of a plurality of half bridges; and
   further comprising at least three circuit configurations, wherein first and second AC voltage terminals of said half bridges are parallel-connected in each case, and wherein said modules of said half bridges are disposed on said heat sink being a shared heat sink.

10. A vehicle, comprising:
at least one said current converter according to claim 6.

11. The vehicle according to claim 10, wherein the vehicle is a rail vehicle.

12. The current converter according to claim 7, wherein said plurality capacitors disposed in the distributed manner are not snubber capacitors.

\* \* \* \* \*

UNITED STATES PATENT AND TRADEMARK OFFICE
CERTIFICATE OF CORRECTION

| | |
|---|---|
| PATENT NO. | : 12,362,651 B2 |
| APPLICATION NO. | : 17/725743 |
| DATED | : July 15, 2025 |
| INVENTOR(S) | : Juergen Boehmer et al. |

Page 1 of 1

It is certified that error appears in the above-identified patent and that said Letters Patent is hereby corrected as shown below:

In the Claims

Claim 10, Column 21, Lines 1-2 should read as follows:
10. A vehicle, comprising:
at least one said current converter according to claim 7.

Signed and Sealed this
Second Day of September, 2025

Coke Morgan Stewart
*Acting Director of the United States Patent and Trademark Office*